United States Patent [19]
Maeda

[11] 3,821,934
[45] July 2, 1974

[54] HEAVY WEIGHT TRANSPORTING TRUCK
[75] Inventor: Kazuo Maeda, Chiba, Japan
[73] Assignee: Mitsui Shipbuilding and Engineering Co., Ltd., Tokyo, Japan
[22] Filed: Jan. 26, 1973
[21] Appl. No.: 326,869

[30] Foreign Application Priority Data
  Jan. 27, 1972  Japan.............................. 47-10374

[52] U.S. Cl................. 104/147, 104/154, 104/162, 105/31, 105/161, 254/105
[51] Int. Cl....................... B61c 11/04, B61b 13/02
[58] Field of Search................... 104/147, 154, 162; 105/29 R, 30, 31, 32, 161; 173/24, 46, 141, 156, 160; 175/92, 122; 299/31, 70; 254/105, 106, 107

[56]   References Cited
  UNITED STATES PATENTS
3,031,167  4/1962  Roussel............................. 254/105
3,033,525  5/1962  Johnson............................. 254/107
3,373,971  3/1968  Chambers et al.................. 254/107
3,464,095  9/1969  Chambers.......................... 254/107
3,559,954  2/1971  Chambers.......................... 254/106

*Primary Examiner*—Drayton E. Hoffman
*Attorney, Agent, or Firm*—Dorfman, Herrell and Skillman

[57]   ABSTRACT

A truck for transporting a heavy weight moved by reciprocating of hydraulic cylinder provided on the truck and by intermittent fixing of the cylinder or piston rod thereof to the ground.

4 Claims, 4 Drawing Figures

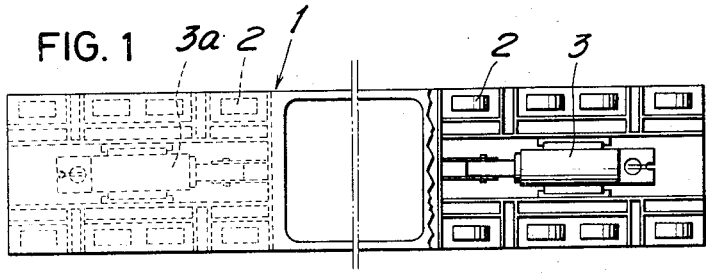
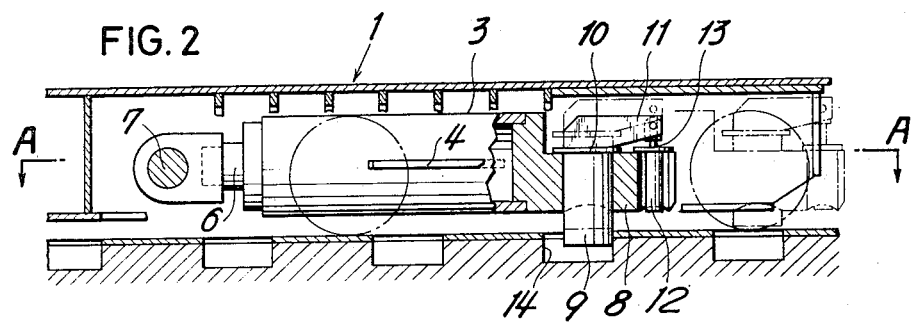
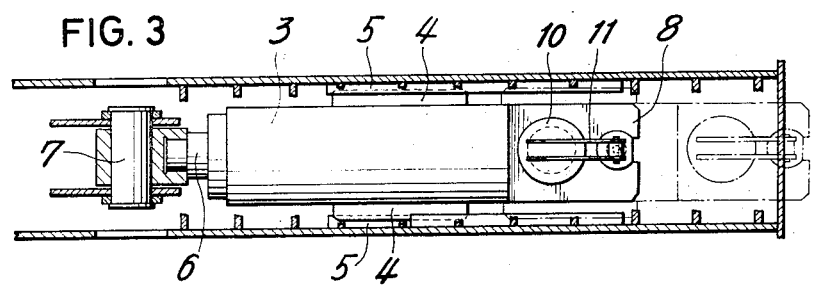
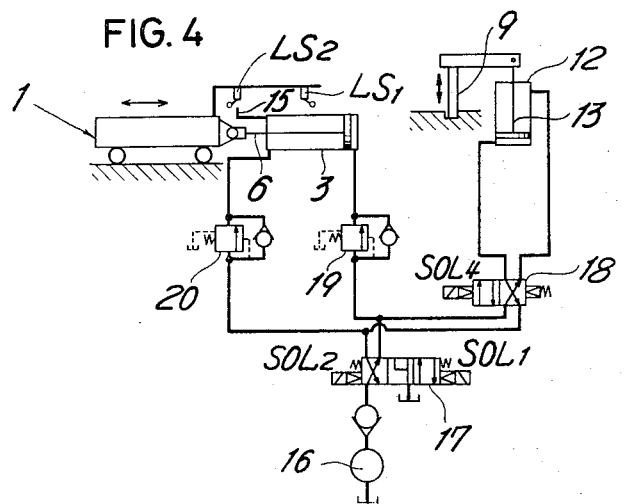

HEAVY WEIGHT TRANSPORTING TRUCK

This invention relates to a truck for transporting a heavy weight such as prefabricated module in the construction of ship.

The truck in accordance with this invention is characterized by that hydraulic cylinder mechanisms having a reciprocating operation along the traverse direction of the truck are provided in the truck body, the cylinders or piston rods thereof are fixed to the truck body, and means for fixing the piston rods or cylinders to the ground, whereby the truck may be moved by reciprocating of the hydraulic cylinder mechanisms and by alternate operation of fixing or releasing of the cylinders or piston rods to or from the ground.

IN THE DRAWINGS

FIG. 1 is a plan view showing a truck according to this invention;

FIG. 2 is a sectional side view of an oil hydraulic cylinder portion;

FIG. 3 is a sectional view taken on line A-A of FIG. 2; and

FIG. 4 is an oil hydraulic circuit.

Referring to the drawings and more particularly to FIGS. 1 to 3, a truck 1 has a plurality of wheels 2 and oil hydraulic cylinders 3, 3a provided in the longitudinal opposite ends. The construction of the hydraulic cylinder 3 of one side will now be described, since both cylinders have the same construction. On the outer surface of the hydraulic cylinder 3 are secured a pair of horizontal plates 4 which are slidably engaged with guide members each of which have a u-shaped section, thereby the hydraulic cylinder being slidably mounted in the truck body. The end of piston rod 6 of the cylinder is fixed to the truck body by a pin 7. A vertical pin 9 is slidably mounted in the projected part 8 on the end of the cylinder 3, and the step plate 10 secured on the top of the pin 9 is connected by a connecting plates 11 to a piston rod 13 of hydraulic cylinder 12 provided in the projected part 8. On the ground, a series of holes 14 are provided at regular intervals, into which the pin 9 can be inserted.

In describing the operation of this truck with reference to FIG. 4 it will be first be assumed that the pin 9 is engaged with the hole 14 as shown in FIG. 2. In this state, a limit switch LS2 is operated by a cam 15 provided on the cylinder 3 to energize a solenoid SOL2. In FIG. 4 pressure oil is introduced in the upper chamber of the cylinder 12 by a pump 16 through directional control valves 17 and 18 so that the pin 9 is lowered to be engaged with a hole 14. When oil pressure in the cylinder 12 is increased higher than predetermined level, pressure oil is introduced in right chamber of the cylinder 3 through a sequence valve 19 to push the piston rod 6 so that the truck 1 is moved to the left. When limit switch LS1 is operated by the cam 15 at the stroke end of the piston, solenoid 1 energized, thereby pressure oil is introduced in the lower chamber of the cylinder 12 so that the pin 9 is raised to be retracted from the hole 14. When oil pressure in the cylinder 12 is increased to a predetermined level, oil is fed to the left chamber of the cylinder 3 through a sequence valve 20 so that the cylinder 3 is moved to the left. Upon operation of the limit switch LS2 at the stroke end, the solenoid SOL2 is energized so that the valve 17 is changed. Thus pressure oil is introduced in the upper chamber of the cylinder 12 thereby the pin 9 being lowered. If the pin 9 contacts to the ground other than the hole 14, the cylinder 3 is moved to the right by the pressure oil introduced in the right chamber thereof without moving the truck, since the cylinder is not fixed to the ground. When the pin coincides with a hole, it engages with the hole. Above mentioned operation will be repeated.

The other hydraulic cylinder 3a is operated in the same manner as above described operation. However, the phase of the operation is different from the former by half a period. Thus the truck is continuously moved.

To move the truck to the right the truck is drawn by the piston rod 6. To this end, the pin 9 is inserted into the hole 14 at another time than the above case. More particularly the solenoid SOL4 of the valve 18 is energized so that the valve is changed. Accordingly, when the limit switch LS2 is operated and the solenoid SOL2 is energized, pressure oil is introduced in the lower chamber of the cylinder 12 so that the pin 9 is retracted in contrast the above operation and oil is introduced in the right chamber of the cylinder 3 thereby the cylinder is slid to the right. When the limit switch LS1 is operated, the pin 9 engages with the hole 14 and oil is fed to the left chamber of the cylinder 3 so that the piston rod 6 is moved to the right. Thus the truck is moved to the right.

From the foregoing it will be understood that the truck in accordance with this invention transports heavy weight without slipping, and operation is safely and reliably performed because moving operation is performed after the cylinder has been fixed relative to the ground.

What is claimed is:

1. A heavy weight transporting truck adapted to be moved along a series of holes in the ground, comprising a main hydraulic cylinder mechanism having a stroke for moving the truck, a fixing hydraulic cylinder mechanism mounted on said main mechanism for temporarily fixing one part of the main hydraulic cylinder mechanism relative to the ground, said fixing mechanism including a part engageable with said series of holes, and a hydraulic circuit having fluid for reciprocating the main hydraulic cylinder mechanism with the predetermined stroke and for operating the fixing hydraulic cylinder mechanism, the hydraulic circuit including valve means positioned between the main hydraulic cylinder mechanism and the fixing hydraulic cylinder mechanism and responsive to the pressure in the fixed hydraulic cylinder mechanism, said valve means providing for the automatic sequential operation of the fixing and main cylinder mechanisms respectively and being operable to permit the pressure fluid to pass therethrough to the main hydraulic cylinder mechanism only after the fluid pressure in the fixing hydraulic cylinder mechanism is increased above a predetermined value.

2. A truck according to claim 1 wherein said circuit first introduces fluid to said fixing cylinder mechanism to first displace said part engageable with the ground, the fluid pressure in said fixing assembly increasing when said part is arrested.

3. A truck according to claim 1 wherein the stroke of said main cylinder assembly is parallel to the ground and the stroke of said fixing cylinder assembly is perpendicular to the ground.

4. A truck according to claim 1 including two main cylinder mechanisms, each having a fixing mechanism thereon, said circuit providing for alternating operation of said mechanisms respectively.

* * * * *